United States Patent [19]
Rader

[11] 3,727,846
[45] Apr. 17, 1973

[54] APPARATUS FOR SHREDDING AND DISPOSING OF CONSTRUCTION WASTE MATERIAL

[76] Inventor: Jerome A. Rader, 900 Pennsylvania Avenue, Miami Beach, Fla. 33139

[22] Filed: Mar. 22, 1971

[21] Appl. No.: 126,794

[52] U.S. Cl. ................. 241/47, 241/101 R, 241/243
[51] Int. Cl. ...................... B02c 13/02, B02c 13/288
[58] Field of Search ............... 241/60, 99, 47, 101 A, 241/101 R, 186 R, 222, 243

[56] References Cited

UNITED STATES PATENTS

| | | | |
|---|---|---|---|
| 2,869,793 | 1/1959 | Montgomery | 241/60 X |
| 2,970,780 | 2/1961 | Bowen | 241/243 X |
| 2,853,247 | 9/1958 | Anderson | 241/190 |
| 2,550,354 | 4/1951 | Jacobsen | 241/101 A |
| 2,646,934 | 7/1953 | Sandor | 241/101 R |

*Primary Examiner*—Robert L. Spruill
*Attorney*—Salter & Michaelson

[57] ABSTRACT

Apparatus for disintegrating and disposing of bulk construction waste materials at a construction site, wherein the bulk material is fed into a shredding device for reducing the material to shredded particulate form, the shredded material thereafter being transferred by a vacuum-blower from the shredding device to a disposal area remote therefrom.

1 Claim, 7 Drawing Figures

PATENTED APR 17 1973
3,727,846
SHEET 1 OF 2
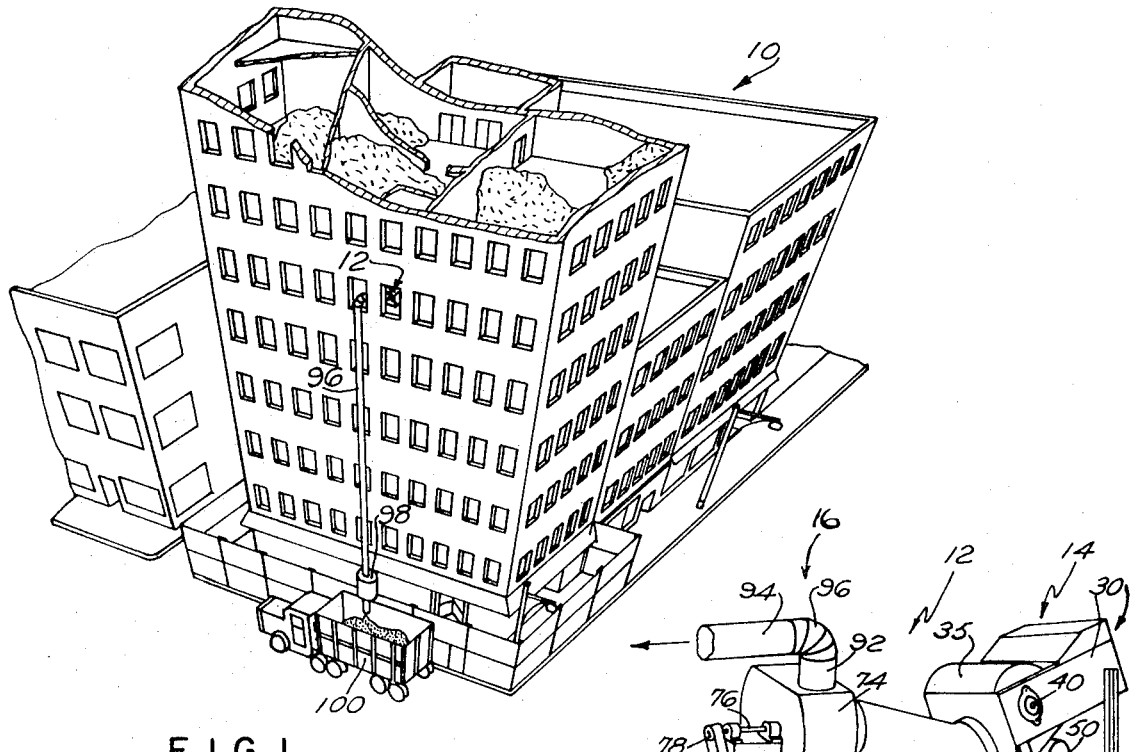
FIG. 1
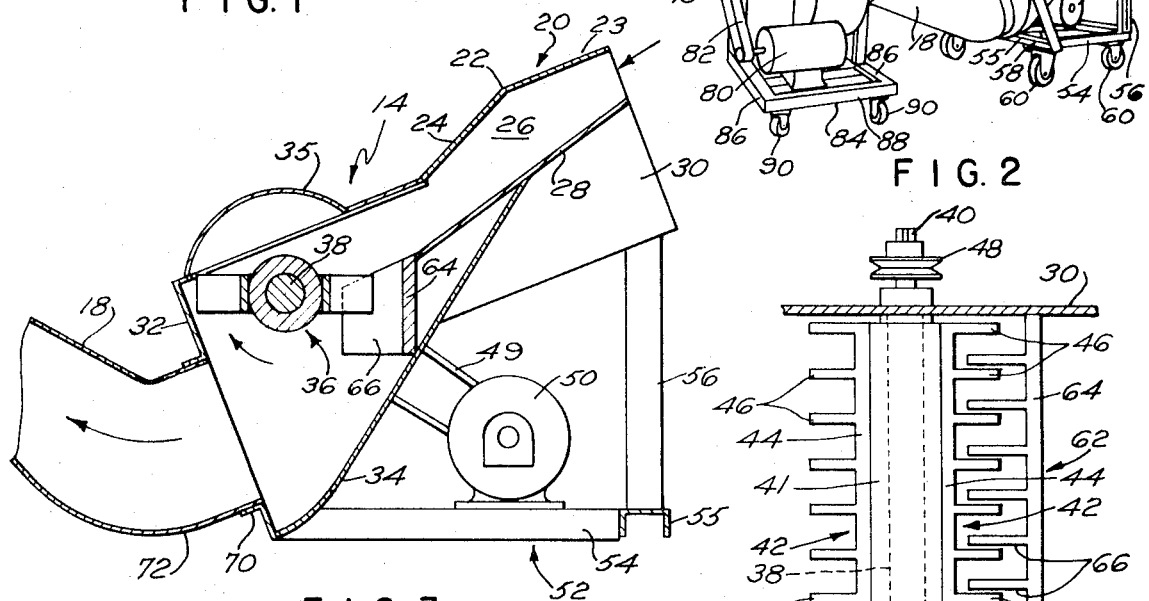
FIG. 2
FIG. 3
FIG. 4
INVENTOR
JEROME A. RADER
BY
Salter & Michaelson
ATTORNEYS

INVENTOR
JEROME A. RADER

BY
Salter & Michaelson
ATTORNEYS

APPARATUS FOR SHREDDING AND DISPOSING OF CONSTRUCTION WASTE MATERIAL

BACKGROUND OF THE INVENTION

The present invention has particular application for use in the reducing of bulk waste materials at a construction site to particulate form so that the waste material may thereafter be easily directed to a disposal area for the removal therefrom.

Prior to the instant invention, it has been the usual practice in the disposing of bulk waste at construction sites to carry the waste material to a discharge area and then deposit the waste material in a waste chute that is normally located at a side of the building construction and that extends to the ground floor. The waste material normally consists of sheet rock or dry wall, paper products such as cardboard, and other similar materials, and because of the irregular patterns of such materials, they are difficult to carry, and, furthermore, when they are deposited in a dump vehicle located at the bottom of the building site they occupy considerable space in the dump vehicle, and consequently labor and dumping costs for the removal of such waste materials as experienced hereto have been unusually high. In this connection, it will be understood that labor must be especially detailed to remove the waste material from various areas in the building site, carrying it to the discharge chute and dumping it therein. As experienced heretofore, this has been a laborious task; and since it does not contribute to the actual construction of the building, waste disposal has been an extreme source of irritation to contractors because of the expenses involved.

SUMMARY OF THE INVENTION

The present invention relates to apparatus for disintegrating and disposing of bulk construction waste materials at a construction site and includes a shredding device into which the bulk construction waste material is fed. The shredding device has a grate located therein, and a rotor having oppositely extending blades fixed thereto is mounted in the shredding device and cooperates with the fixed grate for reducing the bulk material fed thereto to shredded particulate form. A vacuum-blower communicates with the shredding device for removing the particulate material therefrom and for moving the shredded particulate material to a disposal area remote from the shredding device, whereafter the material is removed from the building site by truck or the like. The apparatus is portable and may be moved from one location to another at the construction site and immediately set up for operation so that the bulk waste material may be fed thereto and reduced to the particulate form as indicated, thereby greatly reducing the time and effort required for the disposal thereof.

Accordingly, it is an object of the present invention to provide apparatus for shredding and disposing of construction waste material with a minimum of labor and expense.

Another object is to provide apparatus for the shredding of construction waste material that includes a shredding device having a rotor mounted for rotation therein, the rotor including a plurality of blades that cooperate with a fixed grate for tearing the waste material so as to reduce it to particulate form.

Another object of the invention is to provide a device for shredding construction waste material and that communicates with a vacuum-blower to which the shredded material is directed for transfer to a disposal area.

Still another object is to provide portable apparatus for shredding and disposing of construction waste material including a housing in which a fixed grate and rotatable rotor having blades mounted thereon are located, and a blower communicating with the housing at the discharge end thereof for removing material from said housing as shredded by the rotor and grate and for transferring the shredded material to a disposal area.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of a building construction site showing the general location and use of the apparatus as embodied in the present invention;

FIG. 2 is a perspective view of the apparatus as embodied herein and showing the portable arrangement thereof;

FIG. 3 is a vertical sectional view of the shredding device as embodied in the subject invention;

FIG. 4 is a top plan view of the rotor and grate as located in the housing of the shredding device as illustrated in FIG. 3;

DESCRIPTION OF THE INVENTION

Figure 5:
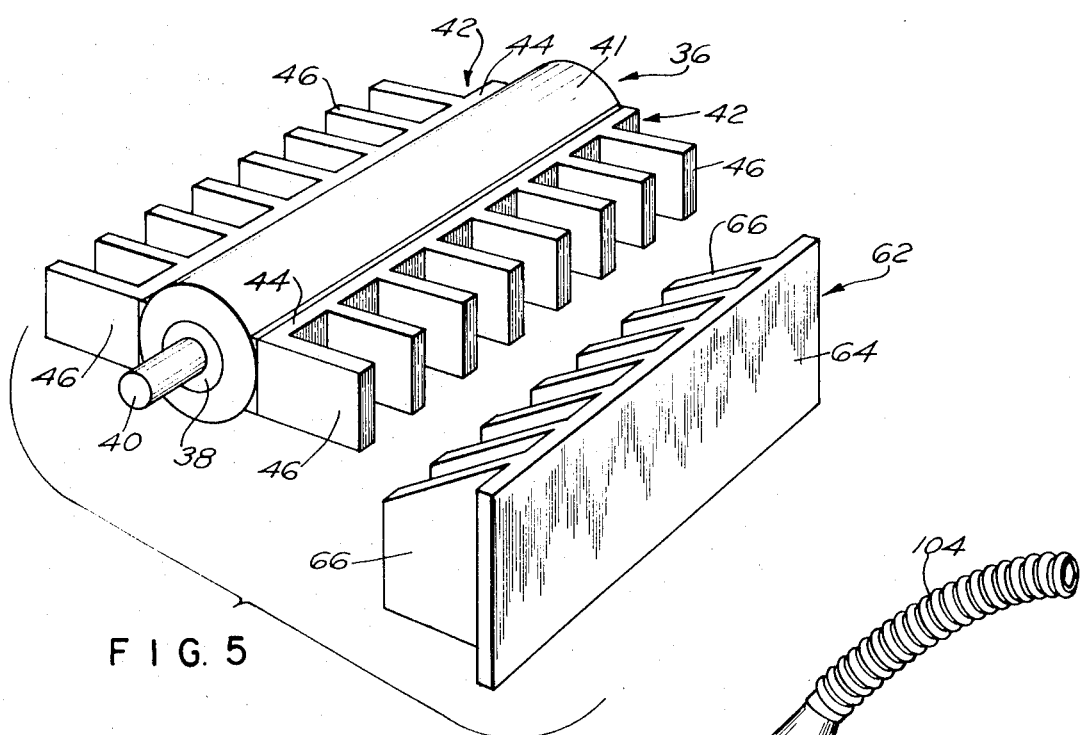
FIG. 5 is an exploded perspective view of the rotor and grate of the shredding device.

Referring now to the drawings and particularly to FIG. 1, a building indicated at 10 is illustrated as it appears in the construction stage; and, as will be described hereinafter, the apparatus that is the subject of the present invention is designed to be used in the shredding and disposing of waste material such as sheet rock, cardboard and the like that is accumulated in the building 10 during the construction thereof.

Referring to FIG. 2, the apparatus embodied in the present invention is generally indicated at 12 and includes a shredding device generally indicated at 14 that is interconnected to a vacuum-blower generally indicated at 16 through a connection member 18. As illustrated in FIG. 1, the apparatus 12 is adapted to be located at any convenient position in the building 10 for the shredding of waste material and would normally be moved from floor to floor of the building so as to be accessible for removing and disposing of the bulk waste material as it accumulates.

Referring now to FIGS. 2 through 5, the shredding device 14 is illustrated in detail and includes a housing generally indicated at 20 into which the waste material is inserted for the shredding thereof. The housing of the shredding device 14 includes a hopper 22 located at the forward end thereof and is formed with a top wall that is defined by a forward top portion 23 to which an angularly disposed rear top portion 24 is joined. Joined to the top portions of the hopper 22 are side walls 26 to which an inclined bottom wall 28 is secured. The bottom wall 28 of the hopper 22 defines a guide for directing the waste material inwardly of the shredding device, as will be described.

The housing 20 on which the hopper 22 is mounted includes vertical side walls 30 that cooperate with a rear wall 32, a downwardly extending bottom wall 34 and a removable dome-shaped cover 35 to form a rotor chamber and a discharge area in which a rotor assembly generally indicated at 36 is mounted. The rotor assembly 36 includes a shaft 38 to which are joined reduced stub shafts 40 that are journalled for rotation in the side walls 30 of the housing 20. A tubular rotor 41, more clearly illustrated in FIG. 5, is mounted in fixed relation on the shaft 38 for rotation therewith.

Mounted on the rotor 41 and disposed 180° diametrically apart thereon are blade assemblies generally indicated at 42, each of the blade assemblies 42 including a plate 44 that is secured to the rotor 40 and that extends longitudinally thereof. Formed as an integral part of the longitudinally extending plate 44 of each blade assembly or welded thereto are a plurality of spaced-apart blades 46, the axes of the blades 46 being perpendicular to the longitudinal axis of the rotor 41. As illustrated in FIGS. 4 and 5, the blades 46 are defined by rigidly constructed bars, the cross-sectional configuration of each bar being substantially rectangular.

In order to provide for rotation of the rotor assembly 36, one of the reduced shafts 38 extends outwardly of a side wall 30 and has a pulley 48 mounted thereon, the pulley 48 being drivingly connected by a belt 49 to a motor 50 that is mounted on a carriage generally indicated at 52. The carriage 52 also supports the housing 20 as will be described, and it is understood that the rotor assembly 36 is driven by the motor 50 when the motor 50 is energized for operation of the shredding device 12.

As previously described, the shredding device 14 is portable in construction and is adapted to be wheeled from one location to another. For this purpose, the carriage 52 is provided and includes lower horizontal frame members 54 and 55. Forward vertical support members 56 and rear inclined support members 58 are joined to the housing 20 and the frame members of the carriage for supporting the housing 20 in the position as illustrated in FIG. 2. Casters 60 are secured to the horizontal members at the corners thereof and provide for convenient rolling movement of the shredding device 14 from one location to another.

As the waste material is fed into the hopper 22 of the shredding device 14, it falls by gravity down the inclined or angularly disposed bottom wall 28 of the hopper 20 and toward the rotor assembly 36. The material then moves over a grate generally indicated at 62 that is located at the bottommost end of the bottom wall of the hopper 22. The grate 62 includes a transversely extending vertical plate 64 to which a plurality of spaced tines or fingers 66 are joined. As illustrated in FIGS. 4 and 5, each of the bars 46 of the rotor assembly 36 is moved into close, adjacent relation to a finger 66 as the rotor assembly 36 is rotated within the housing. It is seen that as the rotor rotates, the bars 46 will strike the waste material located over the grate 62, the blades 46 cooperating with the fingers 66 to break up the bulk waste material in a tearing action and to reduce the bulk waste material to particulate form.

As the waste material is reduced to particulate form by the rotating action of the blades 46 between the fingers 66 of the grate 62, the material falls onto the inclined wall 34 and is directed downwardly into the discharge area of the housing. The plate 64 which is located interiorly of the housing 20 and which extends in a vertical plane acts to direct the ground-up material downwardly to the discharge area of the housing and below the rotor assembly 36.

In order to remove the particulate or ground-up material located in the discharge area of the shredding device 14 to a disposal area, the vacuum-blower 16 is provided, and, as previously described, the vacuum-blower 16 is interconnected to the shredding device 14 through the connecting member 18. As illustrated in FIG. 3, the rear wall 32 of the housing is formed with an opening as defined by an annular flange 70, an elbow portion 72 of the connecting member 18 being received within the annular flange 70.

The vacuum blower 16 includes a housing 74, as illustrated in FIG. 2, in which a conventional centrifugal blower is mounted for rotation. The centrifugal blower is fixed to a shaft 76 that extends outwardly of the housing, the shaft terminating in a pulley 78 that is interconnected to a motor 80 through a belt 82. The housing 74 of the vacuum-blower and the motor 80 are mounted on a carriage generally indicated at 84 that includes horizontal frame members 86 and 88; and mounted on the bottom of the frame members 86 and 88 at the corners thereof are casters 90 that provide for convenient rolling movement of the vacuum-blower 16. The connecting member 18 is joined to the vacuum-blower through a central opening in the front wall thereof, the central opening providing for communication of the discharge area of the shredding device 12 with the suction intake side of the vacuum-blower 16.

Fixed to a top wall of the housing 74 and communicating with an opening that defines the discharge of the vacuum blower 16 is a discharge pipe 92 that is connected to a conduit 94 through an elbow 96. The conduit 94 may be of any required length and, as illustrated in FIG. 1, communicates with a vertically extending tube 96 that extends downwardly on the exterior side of the building construction 10.

In operation of the device, the bulk material, such as sheet rock or wallboard and the like, is fed into the hopper 20 of the shredding device 14 for engagement by the blades 46 of the rotor assembly 36. The tearing action of the blades 46 that is produced when they move between the fingers 66 of the grate 62 reduces the bulk material to particulate form, which then falls by gravity to the bottom of the housing 20 in the discharge area of the shredding device. Since the discharge area of the shredding device is connected to the suction side of the vacuum-blower 16 through the connecting member 18, the ground-up material is drawn inwardly of the housing 74 of the vacuum-blower and is then directed outwardly therefrom through the discharge pipe 92 and conduit 94 to the tube 96. As the material falls by gravity through the tube 96 toward the bottom of the construction site 10, it is received in a dust inhibitor 98 located near the bottom of the building. The dust inhibitor 98 may be of any conventional construction and acts to dispel the dust that is created by movement of the particulate material through the tube. The material is then directed outwardly of the dust inhibitor 98 into a collection area; or, as illustrated in FIG. 1, a truck 100 is provided for receiving the material for removal from the construction site.

Figure 6:
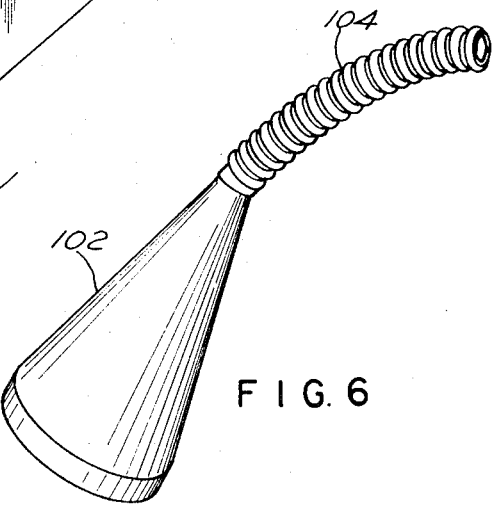
FIG. 6 is an elevational view of an adapter for attachment to the blower of the apparatus embodied herein.
Figure 7:
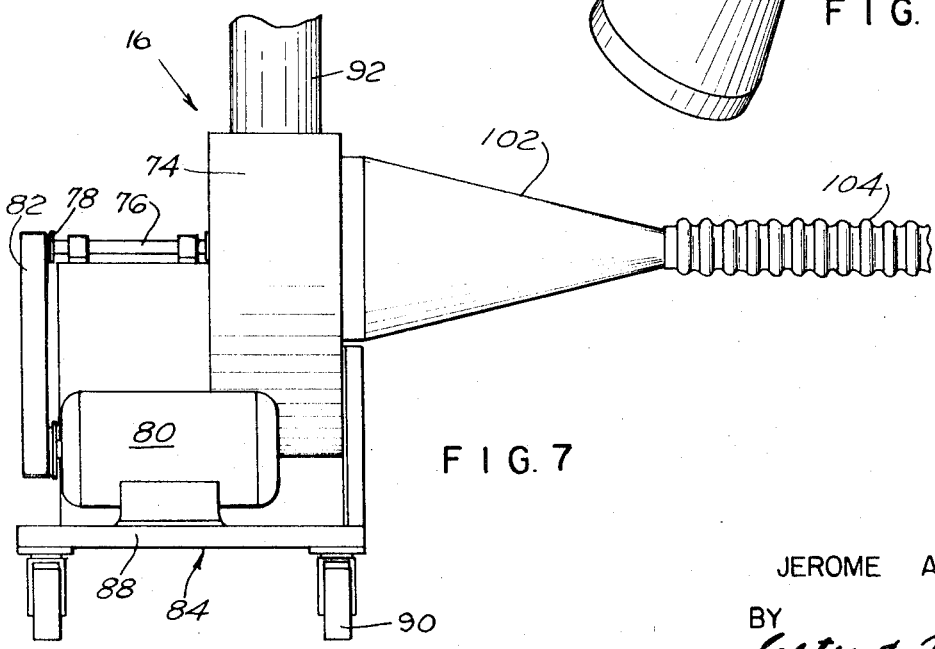
FIG. 7 is an elevational view of the vacuum-blower showing the adapter as illustrated in FIG. 6 attached thereto in the application of use thereof.

Referring now to FIGS. 6 and 7, a modified use of the vacuum-blower 16 is illustrated; and in connection therewith an adapter 102 is provided for replacing the connecting member 18 as shown in FIG. 2. As illustrated in FIG. 6, the adapter 102 has a cone configuration, the larger end thereof being shaped for securement to the inlet side of the vacuum-blower 16. The small end of the cone-shaped adapter 102 is adapted to accomodate a flexible hose 104, the length of which may be of any convenient dimension. With the adapter 102 attached to the vacuum-blower 16, the debris accumulated on the floor during the operation of the apparatus 12 can be picked up and directed to the disposal area as previously described.

It is seen that the apparatus as described herein conveniently provides for quick and easy disposal of bulk material that accumulates in a building construction. The waste material is fed into the shredding device 14, ground up to particulate form, and then transferred by the vacuum-blower 16 to a disposal area where it may be received in a vehicle for transfer away from the construction site. The apparatus is relatively inexpensive and can be moved from one location to another on the carriages 52 and 84 of the shredding device and vacuum-blower, respectively.

It is further seen that the apparatus as described herein eliminates the heretofore known problem of removing the waste material from a construction site and materially reduces the costs for such removal.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

What is claimed is:

1. Apparatus for disintegrating and disposing of bulk construction waste materials at a construction site, comprising a housing, a hopper formed in a forward portion of said housing for receiving said waste material said hopper having an inclined bottom wall defining a guide for directing waste material inwardly of the shredding device, a shredding device located in said housing and communicating with said hopper, said bulk construction waste material being fed from said hopper to said shredding device, and a blower assembly located adjacent to said housing and communicating with said shredding device for removing the shredded material therefrom and for moving the shredded material to a disposal area remote from said apparatus, said shredding device including a rotor that is mounted for rotation in said housing, said rotor having at least two blade assemblies secured thereto, each blade assembly having a plurality of spaced-apart blades that are located at right angles to the longitudinal axis of said rotor, said blade assemblies being disposed 180° diametrically opposite to each other and each of said blades being defined by a bar that is substantially rectangular in cross-sectional configuration, a grate fixed in said housing and communicating with said hopper, said grate including a plurality of fingers between which the blades of said rotor are received as said rotor is rotated, the upper edges of said fingers being substantially coextensive with the inclined bottom wall of said hopper so that the waste material introduced into said hopper is fed directly between the fingers of said grate for engagement by the blades of said rotor, said housing including a downwardly extending bottom wall that is spaced substantially from said rotor to form a discharge area for the waste material as received from said rotor, a rear wall in said housing spaced from said forward portion and having an opening communicating with said discharge area, and a tubular connecting member communicating with said opening in the rear wall of said housing and said blower assembly, wherein particulate material shredded by said rotor is directed from said housing through said connecting member and into said blower assembly for discharge to said area remote from said apparatus.

* * * * *